(12) United States Patent
Roscoe et al.

(10) Patent No.: US 8,548,638 B2
(45) Date of Patent: Oct. 1, 2013

(54) ENERGY MANAGEMENT SYSTEM AND METHOD

(75) Inventors: George William Roscoe, West Hartford, CT (US); Thomas Frederick Papallo, Jr., Farmington, CT (US); Cecil Rivers, Jr., West Hartford, CT (US)

(73) Assignee: General Electric Company, Schenectady, NY (US)

( * ) Notice: Subject to any disclaimer, the term of this patent is extended or adjusted under 35 U.S.C. 154(b) by 525 days.

(21) Appl. No.: 12/388,195

(22) Filed: Feb. 18, 2009

(65) Prior Publication Data

US 2010/0211233 A1    Aug. 19, 2010

Related U.S. Application Data

(60) Provisional application No. 61/097,082, filed on Sep. 15, 2008.

(51) Int. Cl.
*G06F 1/32*    (2006.01)
*G06F 1/28*    (2006.01)

(52) U.S. Cl.
USPC .......................................... 700/296; 700/295

(58) Field of Classification Search
USPC ................................. 700/296, 295
See application file for complete search history.

(56) References Cited

U.S. PATENT DOCUMENTS

| | | | |
|---|---|---|---|
| 548,578 A | 10/1895 | Morris | |
| 2,545,054 A | 3/1951 | Stitz | |
| 3,683,343 A | 8/1972 | Feldman et al. | |
| 4,048,812 A | 9/1977 | Thomason | |
| 4,167,786 A | 9/1979 | Miller et al. | |
| 4,190,756 A | 2/1980 | Foerstner | |
| 4,216,658 A | 8/1980 | Baker, III et al. | |
| 4,247,786 A | 1/1981 | Hedges | |
| 4,362,970 A | 12/1982 | Grady | |
| 4,454,509 A | 6/1984 | Buennagel et al. | |
| 4,637,219 A | 1/1987 | Grose | |
| 4,659,943 A | 4/1987 | Virant | |
| 4,718,403 A | 1/1988 | McCall | |

(Continued)

FOREIGN PATENT DOCUMENTS

| CN | 1692317 A | 11/2005 |
|---|---|---|
| CN | 101013979 A | 8/2007 |

(Continued)

OTHER PUBLICATIONS

Lemay, M.; Nelli, R.; Gross, G; Gunter, C.A.; An Integrated Architecture for Demand Response Communications and Control, Hasaii International Conference on System Sciences, Proceedings of the 41st Annual, 2008, pp. 174-183.*

(Continued)

*Primary Examiner* — Kakali Chaki
*Assistant Examiner* — Walter Hanchak
(74) *Attorney, Agent, or Firm* — Cantor Colburn LLP (57) ABSTRACT

An energy management system manages energy consumption of managed device(s) disposed to receive energy via a meter connected to an energy supply, the energy supply. A system controller has a computer processor that instructs the managed device(s) to employ an operational mode based on the priority, the energy need, the demand state, and whether the energy consumption rate of the managed device(s) exceeds energy available from at least one of the external energy source and internal energy source.

22 Claims, 6 Drawing Sheets

(56) References Cited

U.S. PATENT DOCUMENTS

| | | |
|---|---|---|
| 4,731,547 A | 3/1988 | Alenduff et al. |
| 4,998,024 A | 3/1991 | Kirk et al. |
| 5,040,724 A | 8/1991 | Brinkruff et al. |
| 5,137,041 A | 8/1992 | Hall |
| 5,183,998 A | 2/1993 | Hoffman et al. |
| 5,220,807 A | 6/1993 | Bourne et al. |
| 5,430,430 A | 7/1995 | Gilbert |
| 5,462,225 A | 10/1995 | Massara et al. |
| 5,479,157 A | 12/1995 | Suman et al. |
| 5,479,558 A | 12/1995 | White, Jr. et al. |
| 5,481,140 A | 1/1996 | Maruyama et al. |
| 5,495,551 A | 2/1996 | Robinson, Jr. et al. |
| 5,504,306 A | 4/1996 | Russell et al. |
| 5,505,377 A | 4/1996 | Weiss |
| 5,574,979 A | 11/1996 | West |
| 5,581,132 A | 12/1996 | Chadwick |
| 5,635,895 A | 6/1997 | Murr |
| 5,706,191 A | 1/1998 | Bassett et al. |
| 5,816,491 A | 10/1998 | Berkeley et al. |
| 5,866,880 A | 2/1999 | Seitz et al. |
| 5,874,902 A | 2/1999 | Heinrich et al. |
| 5,880,536 A | 3/1999 | Mardirossian |
| 5,883,802 A | 3/1999 | Harris |
| 5,926,776 A | 7/1999 | Glorioso et al. |
| 5,956,462 A | 9/1999 | Langford |
| 6,018,150 A | 1/2000 | Maher, Jr. |
| 6,026,651 A | 2/2000 | Sandelman |
| 6,080,971 A | 6/2000 | Seitz |
| 6,118,099 A | 9/2000 | Lake |
| 6,179,213 B1 | 1/2001 | Gibino et al. |
| 6,185,483 B1 | 2/2001 | Drees |
| 6,229,433 B1 | 5/2001 | Rye et al. |
| 6,244,831 B1 | 6/2001 | Kawabata et al. |
| 6,380,866 B1 | 4/2002 | Sizer, II et al. |
| 6,400,103 B1 | 6/2002 | Adamson |
| 6,480,753 B1 | 11/2002 | Calder et al. |
| 6,489,597 B1 | 12/2002 | Hornung |
| 6,694,927 B1 | 2/2004 | Pouchak et al. |
| 6,704,401 B2 | 3/2004 | Piepho et al. |
| 6,778,868 B2 | 8/2004 | Imamura et al. |
| 6,784,872 B1 | 8/2004 | Matsui et al. |
| 6,806,446 B1 | 10/2004 | Neale |
| 6,817,195 B2 | 11/2004 | Rafalovich et al. |
| 6,828,695 B1 | 12/2004 | Hansen |
| 6,873,876 B1 | 3/2005 | Aisa |
| 6,904,385 B1 | 6/2005 | Budike |
| 6,922,598 B2 | 7/2005 | Lim et al. |
| 6,943,321 B2 | 9/2005 | Carbone et al. |
| 6,961,642 B2 | 11/2005 | Horst |
| 6,983,210 B2 | 1/2006 | Matsubayashi et al. |
| 7,039,575 B2 | 5/2006 | Juneau |
| 7,043,380 B2 | 5/2006 | Rodenberg, III et al. |
| 7,053,790 B2 | 5/2006 | Jang et al. |
| 7,057,140 B2 | 6/2006 | Pittman |
| 7,069,090 B2 | 6/2006 | Huffington et al. |
| 7,082,380 B2 | 7/2006 | Wiebe et al. |
| 7,110,832 B2 | 9/2006 | Ghent |
| 7,155,305 B2 | 12/2006 | Hayes et al. |
| 7,164,851 B2 | 1/2007 | Sturm et al. |
| 7,206,670 B2 | 4/2007 | Pimputkar et al. |
| 7,266,962 B2 | 9/2007 | Montuoro et al. |
| 7,274,973 B2 | 9/2007 | Nichols et al. |
| 7,274,975 B2 | 9/2007 | Miller et al. |
| 7,368,686 B2 | 5/2008 | Etheredge et al. |
| 7,372,002 B2 | 5/2008 | Nakamura et al. |
| 7,420,140 B2 | 9/2008 | Lenhart, Jr. et al. |
| 7,420,293 B2 | 9/2008 | Donnelly et al. |
| 7,446,646 B2 | 11/2008 | Huomo |
| 7,478,070 B2 | 1/2009 | Fukui et al. |
| 7,561,977 B2 | 7/2009 | Horst et al. |
| 7,685,849 B2 | 3/2010 | Worthington |
| 7,720,035 B2 | 5/2010 | Oh et al. |
| 7,751,339 B2 | 7/2010 | Melton et al. |
| 7,783,390 B2 | 8/2010 | Miller |
| 7,919,729 B2 | 4/2011 | Hsu |
| 7,925,388 B2 | 4/2011 | Ying |
| 7,962,248 B2 | 6/2011 | Flohr |
| 7,991,513 B2 | 8/2011 | Pitt |
| 8,024,073 B2 | 9/2011 | Imes et al. |
| 8,027,752 B2 | 9/2011 | Castaldo et al. |
| 8,033,686 B2 | 10/2011 | Recker et al. |
| 8,094,037 B2 | 1/2012 | Unger |
| 8,190,302 B2 | 5/2012 | Burt et al. |
| 2001/0025349 A1 | 9/2001 | Sharood et al. |
| 2001/0048361 A1 | 12/2001 | Mays et al. |
| 2002/0024332 A1 | 2/2002 | Gardner |
| 2002/0125246 A1 | 9/2002 | Cho et al. |
| 2002/0175806 A1 | 11/2002 | Marneweck et al. |
| 2002/0196124 A1 | 12/2002 | Howard et al. |
| 2002/0198629 A1 | 12/2002 | Ellis |
| 2003/0036820 A1 | 2/2003 | Yellepeddy et al. |
| 2003/0043845 A1 | 3/2003 | Lim et al. |
| 2003/0178894 A1 | 9/2003 | Ghent |
| 2003/0193405 A1 | 10/2003 | Hunt et al. |
| 2003/0194979 A1 | 10/2003 | Richards et al. |
| 2003/0233201 A1 | 12/2003 | Horst et al. |
| 2004/0024483 A1 | 2/2004 | Holcombe |
| 2004/0034484 A1 | 2/2004 | Solomita et al. |
| 2004/0098171 A1 | 5/2004 | Horst |
| 2004/0100199 A1 | 5/2004 | Yang |
| 2004/0107510 A1 | 6/2004 | Buckroyd et al. |
| 2004/0112070 A1 | 6/2004 | Schanin |
| 2004/0117330 A1 | 6/2004 | Ehlers et al. |
| 2004/0118008 A1 | 6/2004 | Jeong et al. |
| 2004/0128266 A1 | 7/2004 | Yellepeddy et al. |
| 2004/0133314 A1 | 7/2004 | Ehlers et al. |
| 2004/0139038 A1 | 7/2004 | Ehlers et al. |
| 2004/0254654 A1 | 12/2004 | Donnelly et al. |
| 2005/0011205 A1 | 1/2005 | Holmes et al. |
| 2005/0134469 A1 | 6/2005 | Odorcic et al. |
| 2005/0138929 A1 | 6/2005 | Enis et al. |
| 2005/0173401 A1 | 8/2005 | Bakanowski et al. |
| 2005/0184046 A1 | 8/2005 | Sterling |
| 2005/0190074 A1 | 9/2005 | Cumeralto et al. |
| 2006/0031180 A1 | 2/2006 | Tamarkin et al. |
| 2006/0036338 A1 | 2/2006 | Harkcom et al. |
| 2006/0068728 A1 | 3/2006 | Ishidoshiro et al. |
| 2006/0095164 A1 | 5/2006 | Donnelly et al. |
| 2006/0123807 A1 | 6/2006 | Sullivan et al. |
| 2006/0159043 A1 | 7/2006 | Delp et al. |
| 2006/0190139 A1 | 8/2006 | Reaume et al. |
| 2006/0208570 A1* | 9/2006 | Christian et al. ............ 307/10.1 |
| 2006/0272830 A1 | 12/2006 | Fima |
| 2006/0276938 A1 | 12/2006 | Miller |
| 2006/0289436 A1 | 12/2006 | Carbone et al. |
| 2007/0005195 A1 | 1/2007 | Pasquale et al. |
| 2007/0043478 A1 | 2/2007 | Ehlers et al. |
| 2007/0136217 A1 | 6/2007 | Johnson et al. |
| 2007/0151311 A1 | 7/2007 | McAllister et al. |
| 2007/0185675 A1 | 8/2007 | Papamichael et al. |
| 2007/0203860 A1 | 8/2007 | Golden et al. |
| 2007/0213880 A1 | 9/2007 | Ehlers |
| 2007/0220907 A1 | 9/2007 | Ehlers |
| 2007/0229236 A1 | 10/2007 | Mercer et al. |
| 2007/0271006 A1 | 11/2007 | Golden et al. |
| 2007/0276547 A1 | 11/2007 | Miller |
| 2008/0029081 A1 | 2/2008 | Gagas et al. |
| 2008/0034768 A1 | 2/2008 | Pimentel et al. |
| 2008/0083729 A1 | 4/2008 | Etheredge et al. |
| 2008/0106147 A1 | 5/2008 | Caggiano et al. |
| 2008/0120790 A1 | 5/2008 | Ashrafzadeh et al. |
| 2008/0122585 A1 | 5/2008 | Castaldo et al. |
| 2008/0136581 A1 | 6/2008 | Heilman et al. |
| 2008/0144550 A1 | 6/2008 | Makhlouf et al. |
| 2008/0167756 A1 | 7/2008 | Golden et al. |
| 2008/0167931 A1 | 7/2008 | Gerstemeier et al. |
| 2008/0172312 A1* | 7/2008 | Synesiou et al. ................ 705/34 |
| 2008/0177678 A1 | 7/2008 | Di Martini et al. |
| 2008/0204240 A1 | 8/2008 | Hilgers et al. |
| 2008/0215263 A1 | 9/2008 | Flohr |
| 2008/0272934 A1 | 11/2008 | Wang et al. |
| 2008/0277487 A1 | 11/2008 | Mueller et al. |
| 2009/0038369 A1 | 2/2009 | Vondras |
| 2009/0063257 A1 | 3/2009 | Zak et al. |

| | | | |
|---|---|---|---|
| 2009/0105888 | A1 | 4/2009 | Flohr et al. |
| 2009/0146838 | A1 | 6/2009 | Katz |
| 2009/0235675 | A1 | 9/2009 | Chang et al. |
| 2009/0240381 | A1* | 9/2009 | Lane .......................... 700/296 |
| 2009/0326728 | A1 | 12/2009 | Chrisop et al. |
| 2010/0017242 | A1 | 1/2010 | Hamilton et al. |
| 2010/0070091 | A1 | 3/2010 | Watson et al. |
| 2010/0092625 | A1 | 4/2010 | Finch et al. |
| 2010/0131117 | A1 | 5/2010 | Mattiocco et al. |
| 2010/0175719 | A1 | 7/2010 | Finch et al. |
| 2010/0179708 | A1 | 7/2010 | Watson et al. |
| 2010/0262963 | A1 | 10/2010 | Wassermann et al. |
| 2010/0301774 | A1 | 12/2010 | Chemel et al. |
| 2011/0001438 | A1 | 1/2011 | Chemel et al. |
| 2011/0062142 | A1 | 3/2011 | Steurer |
| 2011/0085287 | A1 | 4/2011 | Ebrom et al. |
| 2011/0087382 | A1 | 4/2011 | Santacatterina et al. |
| 2011/0095017 | A1 | 4/2011 | Steurer |
| 2011/0106328 | A1 | 5/2011 | Zhou et al. |
| 2011/0114627 | A1 | 5/2011 | Burt |
| 2011/0123179 | A1 | 5/2011 | Roetker et al. |
| 2011/0148390 | A1 | 6/2011 | Burt et al. |
| 2011/0290781 | A1 | 12/2011 | Burt et al. |
| 2012/0054123 | A1 | 3/2012 | Broniak et al. |

FOREIGN PATENT DOCUMENTS

| | | |
|---|---|---|
| EP | 1496324 A1 | 1/2005 |
| GB | 2105127 A | 3/1983 |
| JP | 11313441 A | 11/1999 |
| KR | 100676905 B1 | 1/2007 |
| WO | 86/00976 A1 | 2/1986 |
| WO | 90/12261 A1 | 10/1990 |
| WO | 9848335 A1 | 10/1998 |
| WO | 2007060059 A1 | 5/2007 |
| WO | 2007136456 A2 | 11/2007 |

OTHER PUBLICATIONS

Extended European Search Report for EP Application No. 10153695.1-2221, dated May 24, 2012, pp. 1-11.

International Search Report from PCT Application No. PCT/US2009/056878, Nov. 17, 2009.

International Search Report from PCT Application No. PCT/US2009/056882, Nov. 4, 2009.

International Search Report from PCT Application No. PCT/US2009/056883, Oct. 26, 2009.

International Search Report from PCT Application No. PCT/US2009/056886, Nov. 5, 2009.

International Search Report from PCT Application No. PCT/US2009/056889, Nov. 10, 2009.

International Search Report from PCT Application No. PCT/US2009/056894, Nov. 13, 2009.

International Search Report from PCT Application No. PCT/US2009/056895, Nov. 9, 2009.

International Search Report from PCT Application No. PCT/US2009/056901, Nov. 10, 2009.

International Search Report from PCT Application No. PCT/US2009/056906, Nov. 10, 2009.

International Search Report from PCT Application No. PCT/US2009/056913, Nov. 10, 2009.

International Search Report from PCT Application No. PCT/US2009/056914, Nov. 2, 2009.

International Search Report from PCT Application No. PCT/US2009/056919, Nov. 2, 2009.

Partial European Search Report for corresponding EP Application No. 10153695.1-2221, dated Jan. 18, 2012, pp. 1-7.

English Translation of Chinese Search Report for CN Application No. 2010101352688, dated Oct. 24, 2012, pp. 1-5.

PCT Application No. PCT/US09/56911, Search Report, Mar. 10, 2010.

Real-Time Feedback Your Key to Electricity Savings [online]; retrieved on Aug. 7, 2012; retrieved from the Internet: http://oee.nrcan.gc.ca/publications/equipment/10918.

Chinese Office Action for CN Application No. 201010125729.3, dated Jun. 25, 2013, pp. 1-18.

* cited by examiner

ENERGY MANAGEMENT SYSTEM AND METHOD

CROSS-REFERENCE TO RELATED APPLICATIONS

This application claims the benefit of U.S. Provisional Application No. 61/097,082, filed 15 Sep. 2008.

BACKGROUND OF THE INVENTION

This disclosure relates to utility energy management, and more particularly to management of a energy supply of a utility company or of an entire supply system. In addition, this disclosure relates to energy management of facilities using energy-using devices, including such facilities as, but not limited to, households, commercial installations, manufacturing facilities, and office buildings. The disclosure finds particular application to varying consumption of a facility or of a group of facilities in accordance with demand on supply as a whole, demand of individual devices, priority of devices within a group of devices, and user preferences.

Utilities generally produce or purchase energy for customer usage in response to demand up to a maximum amount available or a maximum amount that can be handled by a distribution network. Cost and strain on the distribution network and/or on the generation and storage facilities generally increases with demand. Additional strain can be introduced by sudden changes in demand.

BRIEF DESCRIPTION OF THE INVENTION

An embodiment of an energy management system manages the energy consumption of at least one managed device. The managed device is disposed to receive energy via a meter connected to an energy supply, the energy supply including at least one of an external energy source and an internal energy source. The system includes a system controller with a computer processor configured for communication with the managed devices, the meter, and a computer readable storage medium. The computer readable storage medium contains computer executable instructions that, when executed by the computer processor, perform a method including obtaining an energy consumption rate of the at least one managed device from the meter, determining whether the energy consumption rate exceeds energy available from the internal energy source, and obtaining demand information from a demand information source, the demand information comprising information about a demand state of the external energy source. The method also includes determining from the demand information whether the demand state of the external energy source is a peak demand state, determining a priority of the at least one managed device, and determining an energy need of the at least one managed device. The method instructs the at least one managed device to employ an operational mode based on the priority, the energy need, the demand state and whether the energy consumption rate of the at least one managed device exceeds energy available from at least one of the external energy source and internal energy source.

Another embodiment includes a facility energy management system for managing energy consumption of a facility connected to an energy supply, the energy supply including at least one of an external energy source and an internal energy source. The facility has at least one energy consuming device, and the system includes a system controller with a computer processor configured for communication with the managed device, the external energy source, and the internal energy source. The computer processor is also in communication with a computer readable storage medium containing computer executable instructions that, when executed by the computer processor, perform a method including obtaining external energy source information including at least one of demand state, demand limit, and cost, obtaining internal energy source information including at least one of a quantity of energy available and a supply rate available, establishing a maximum energy consumption value for the facility based on the external and internal energy source information, and instructing the at least one managed device to employ an operational mode based on the maximum energy consumption value, the demand state, and the demand limit.

Additionally, an embodiment of a facility energy management system for a facility connected to and selectively drawing energy from an external energy supply is disclosed. The system includes a computer readable storage medium including computer executable code in a format readable and executable by a computer processor, a system controller including a computer processor and connected to the computer readable storage medium such that the system controller loads and executes the computer executable code. The computer executable code causes the computer processor to receive a facility demand limit, determine a demand state that is one of at least a peak demand state and an off-peak demand state, and allocate a facility energy demand of a facility based on a priority of an energy consuming device in the facility and on an energy need of the energy consuming device, the energy need being determined by a minimum energy requirement of the energy consuming device for proper operation. The code additionally causes the processor to, responsive to determining that a local energy storage unit is present and is depleted, initiate charging the local energy storage unit during an off-peak demand state, responsive to determining that a local energy storage unit is present and that an energy demand of the facility exceeds the demand limit, draw energy from the local energy storage unit. amd. responsive to determining that a local energy generation device is present, initiate drawing energy from the local energy generation device when an energy demand of the facility exceeds the demand limit. The code further causes the processor to, responsive to a high priority of the energy consuming device, instruct the energy consuming device to employ a normal operational mode, responsive to a low priority of the energy consuming device, instruct the energy consuming device to employ a reduced operational mode, and. responsive to an energy need of the energy consuming device exceeding an amount of energy supplied in a reduced operational mode, override an instruction to employ the reduced operational mode. The code also causes the processor, responsive to a customer command, override an instruction to employ the reduced operational mode.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

With reference to the accompanying Figures, examples of a facility energy management system and method according to embodiments of the invention are disclosed. For purposes of explanation, numerous specific details are shown in the drawings and set forth in the detailed description that follows in order to provide a thorough understanding of embodiments of the invention. It will be apparent, however, that embodiments of the invention may be practiced without these specific details. In other instances, well-known structures and devices are schematically shown in order to simplify the drawing.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

As used in the instant disclosure, "energy" includes, but is not limited to, electricity, natural gas, heating oil, propane, hydrogen, biodiesel, ethanol, and other fuels, as well as steam and compressed air in some applications.

Figure 1:
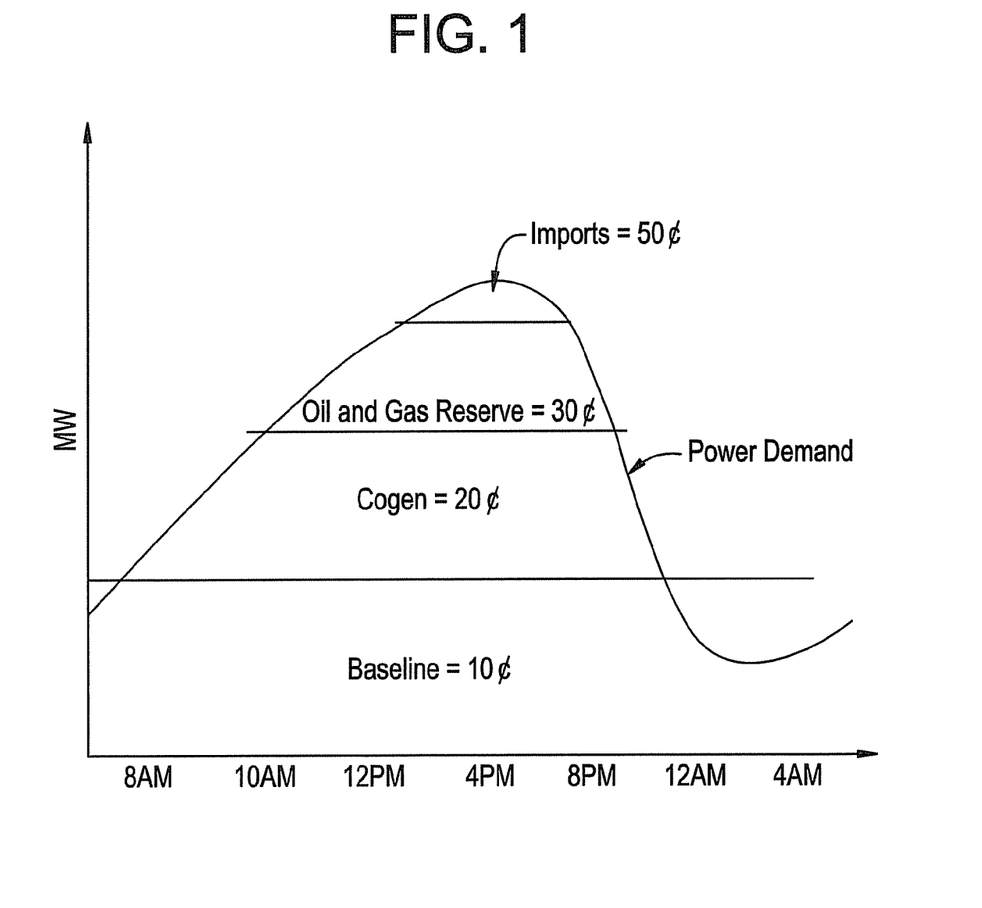
FIG. 1 is an illustration of the variation of energy demand during a typical day.

Utilities generally produce or purchase energy for customer usage in response to demand for the energy up to a maximum amount of energy available or a maximum amount of energy that can be handled by a distribution network. As seen in FIG. 1, demand for, for example, electricity during the course of a day may vary, with a peak demand typically occurring between 1 p.m. and 7 p.m. The utilities generally charge a flat rate per unit of energy delivered, but with increasing cost of fuel prices and high energy usage at certain parts of the day, utilities have to buy more energy to supply customers during peak demand, as illustrated in FIG. 1. As demand increases, so does cost of energy generation or supply. As also seen in FIG. 1, a utility company may have a baseline cost of ten cents per megawatt-hour, for example, up to a particular level of energy demand, but above that level, cost increases to twenty cents per megawatt, for example, because of additional energy generation equipment being brought on line or the utility being required to purchase energy. The cost may increase at additional levels of generation due to the need to tap into reserve generation capability and/or to purchase energy from outside sources connected to the grid. Thus, during peak demand, strain on energy production and supply equipment is highest, and cost of energy production is highest, while at the lowest off-peak demand level, strain on energy production and supply equipment is lowest, and the cost of energy production is simply the baseline cost.

Figure 2:
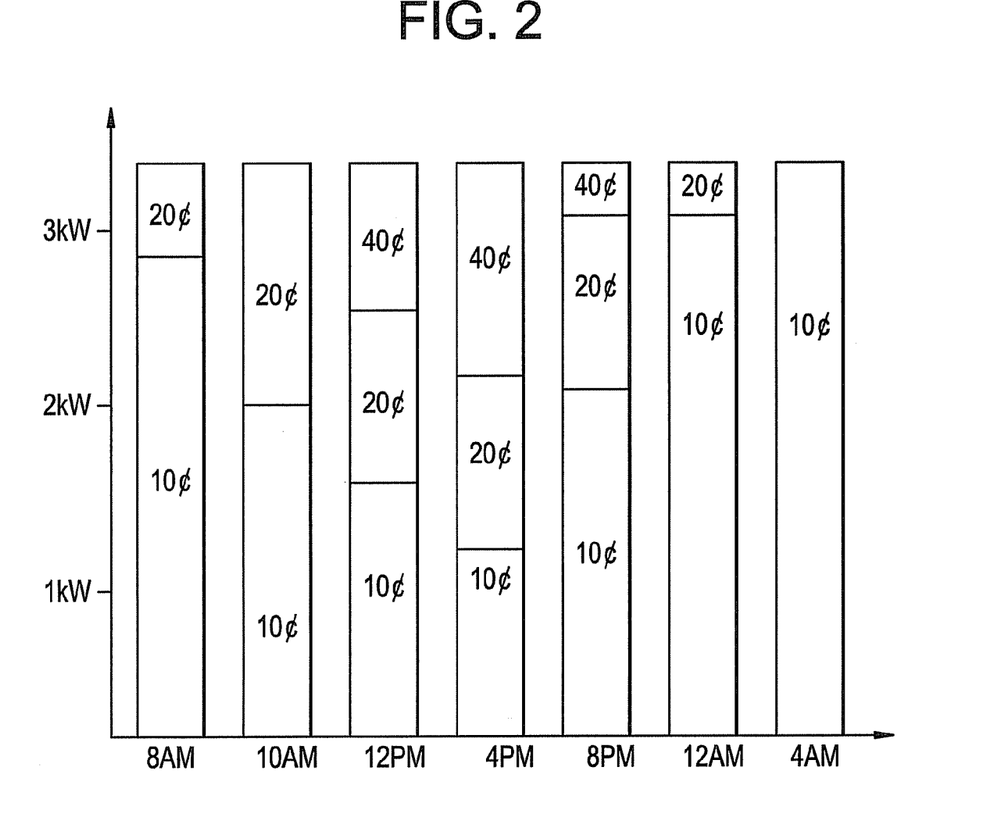
FIG. 2 is an illustration of a type of rate schedule that might be adopted by a utility company.

Consequently, it would be beneficial for utilities to shift demand to ease strain on energy production and supply equipment. Additional benefit could be achieved were utilities to charge higher rates during peak demand to cover their increased costs of production and supply, and also to shift demand to other parts of the day. To take fluctuations of demand and energy production costs into account, rate schedules such as that seen in FIG. 2 can be employed that charge customers a first price per energy unit up to a first threshold number of energy units consumed during a particular time of day with a second rate applying to energy above the first threshold, and possibly including additional rates applying to additional consumption ranges. The thresholds and rates will vary with time of day and/or level of demand. If a facility's peak demand can be lowered, then a cost savings of significant proportion can be achieved for the customer and for the utilities, and the peak load that the utility has to accommodate can be reduced.

Figure 3:
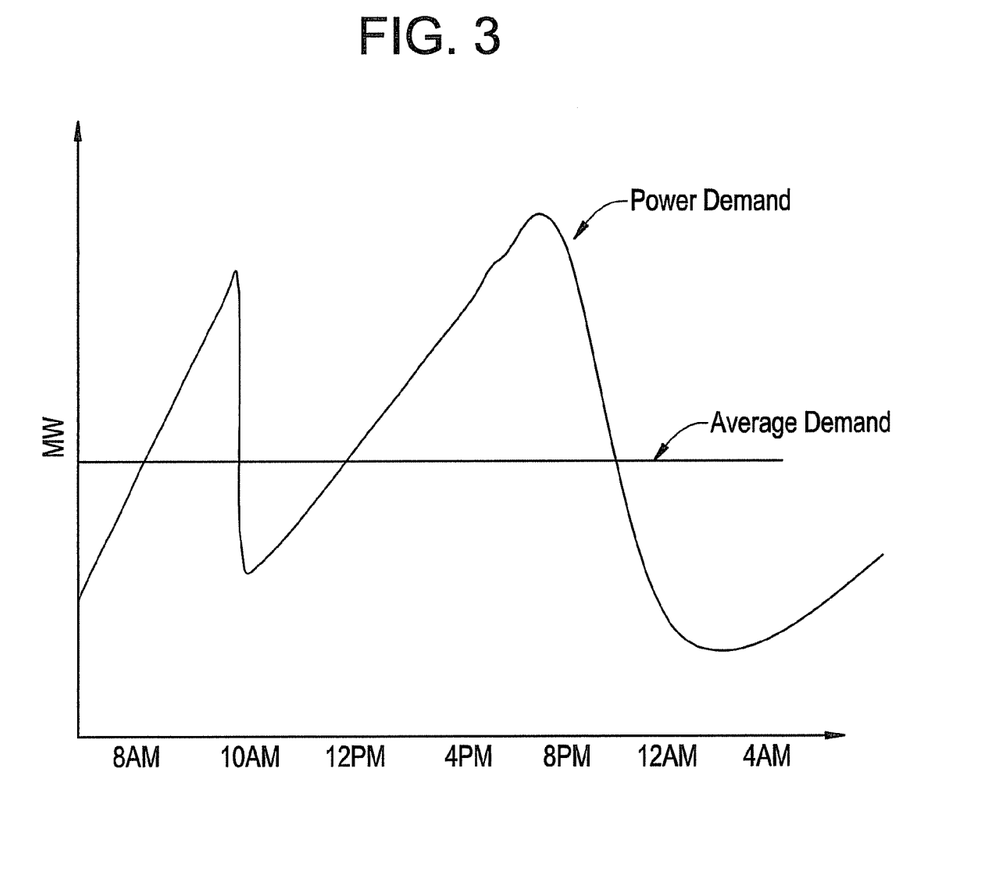
FIG. 3 is a schematic illustration of an energy demand curve expected using certain energy management systems.

One possible solution provides a system where a controller minimizes facility energy consumption. For example, the controller "switches" the actual energy supply to the energy consuming devices, such as appliances or control units, on and off. Another possible solution is to vary different functions of energy consuming devices with demand, such as by employing preprogrammed energy savings and/or other operational modes of one or more of the energy consuming devices as instructed by the system controller, an on-board controller, or other apparatus. Still another possible solution includes an Advanced Metering Infrastructure (AMI) system in which a computer system at a utility company controls or communicates with a meter at a facility to control energy usage in the facility. The meter would communicate with a controller, which would implement various strategies to minimize facility energy demand. However, any solution that focuses on energy use minimization and/or solely on the energy consumption of a single facility can lead to sudden, dramatic drops in demand on the overall energy supply and distribution system as illustrated in FIG. 3. For example, in an arrangement where a large percentage of residential facilities have energy consumption scheduled to be minimized at 9 a.m., a demand drop of 20% could be experienced. Even a 10% drop in demand presents a problem to energy generation facilities since they typically can not simply drop production, but require time to reduce production to the new, substantially lower amount. While reducing energy production, excess energy generated will go unused unless it can be stored in some sort of energy storage medium or device, such as batteries, capacitors, or mechanical or potential energy. For example, some hydroelectric facilities will use excess energy to pump water into the source or into an alternate reservoir so that at least part of the excess energy can be used at a later time when demand is higher than the facility would otherwise be able to produce.

There is thus a need for an energy management system and method that optimizes facility energy consumption, yet takes the state of the overall energy production and supply system into account. There is also a need for an energy management system that provides a method of distributing energy demand and changes in energy demand to avoid sudden, dramatic changes in energy demand on the overall energy production and supply system.

Broadly, embodiments of the invention are directed to management of energy supply and consumption. Embodiments include a demand-limit-based system and method to reduce energy consumption over a distribution network during on-peak or peak demand hours by reducing the demand on the energy supply chain, including, but not limited to, the energy distribution network. In addition, demand is distributed over a greater period to lessen a negative impact on, for example, energy generation facilities that might otherwise be experienced by a sudden drop in demand. Embodiments also provide cost savings to the user/consumer/customer by reducing consumption of, for example, energy consuming devices under the customer's control during times when energy is more expensive, such as during peak demand. These benefits are provided via a system and method that are easy to use, convenient, and substantially transparent to the customer once set up and operating. Additional cost savings are enjoyed in embodiments by adding local energy storage and/or generation at customer sites and integrating control of such local energy storage and/or generation devices into the system and method of embodiments. Still more savings can be achieved by including energy consuming devices that have multiple levels of energy consumption via multiple operational modes, particularly such energy consuming devices that are "intelligent." That is, energy consuming devices each including a module with a controller that can process incoming signals and/or determine various ambient conditions and/or monitor operating variables of the respective device can provide more efficient, lower cost operation, particularly in on peak situations or peak demand states. With wide usage of the system and method of embodiments, the resulting redistribution of energy demand can reduce strain on the energy production and supply system. For example, the resulting reduction in energy consumption during peak demand periods can reduce or eliminate rolling brownouts or blackouts that occur during such periods. In addition, the system and method of embodiments take advantage of numerous communications protocols to simplify installation and communication, such as, for example, WiFi, ZigBee®, PLC, Ethernet, X10®, FM, AM/SSB, Radio Broadcast Data System, and several additional simple, low cost protocols as will be described. These can be employed in single source embodiments, demand side management embodiments, and embodiments that employ a mixture thereof.

Still more savings are achieved in embodiments employing subscription based utility services in which a customer agrees to let another party, such as a utility company, control the utility product consumption of facilities under the customer's control. In such embodiments, a third party, such as a utility company, offers energy at lower rates via a subscription agreement in which customers typically agree to limit or eliminate their ability to override reduced energy consumption measures implemented by the system at the utility company's instruction. Under some such subscription agreements, override capability is disabled or the system notifies the utility company of an override so that appropriate action, such as billing and/or cancellation of the subscription plan, can be taken.

Figure 4:
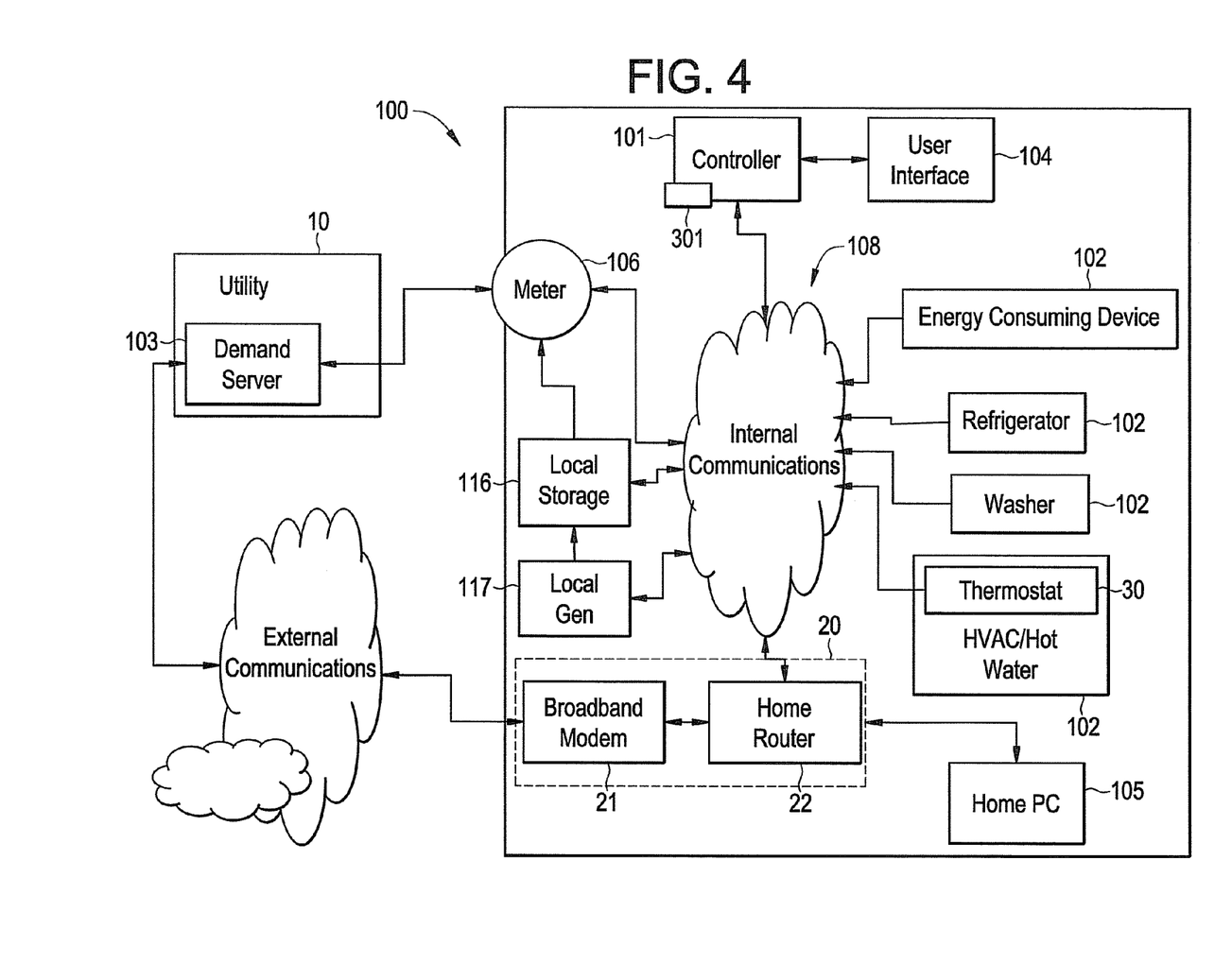
FIG. 4 is a schematic illustration of a facility energy management system according to an embodiment.

With reference to FIG. 4, a facility energy management system 100 includes a system controller 101. The system controller 101 includes a computer processor 301 and is responsive to demand information, such as a demand state and a demand limit, to control an amount of energy consumed by the facility, such as by controlling energy usage by one or more managed devices 102, such as energy consuming devices. The demand state represents a level of energy demand on the external energy supply or source 10, such as a utility, and typically will be either peak or off-peak, though other demand states can be employed as discussed above. The demand limit represents a maximum amount of energy the system controller 101 is permitted to draw from the external energy supply 10 for use by the facility. Examples of a managed or energy consuming device 102 include, but are not limited to, an appliance, a climate control system, a hot water heater having a thermostat 30, lighting, or a consumer electronics device. In an embodiment, the system controller 101 has access to an energy consumption rate of the facility at any given time and/or the maximum amount of energy the energy consuming device 102 will consume. For example, the system controller 101 polls a meter 106 to obtain a current consumption rate.

The demand state and the demand limit are provided by a demand information source 103 which, in an embodiment, includes a preloaded schedule. In another embodiment, the schedule is loaded or programmed by the customer, but in yet another embodiment, the demand information source 103 is a computer-based demand server, and the system controller polls the demand server for the schedule. Advantageously, a demand server in embodiments is a computer system based in a coordinating entity 10, such as a utility company facility. Alternatively, an embodiment determines the demand state and the demand limit by receiving updates from the demand server 103 when these variables change.

In embodiments, the customer can view and/or enter data or information via a processor driven user interface 104 connected to the system controller 101. The user interface, for example, allows the demand limit to be set by a customer, overriding any other demand limit provided, such as a demand limit provided by the demand server 103 where a demand server 103 is employed or provided by a schedule where a schedule is employed. For example, the user interface 104 of an embodiment includes a display, such as a screen or indicator lights, and an input device, such as a touch-screen interface, a keypad, a keyboard, or buttons. In an embodiment, the user interface 104 is provided via the display of a personal computer 105, the input device being the input device(s) of the personal computer. The user interface 104 in embodiments is part of the system controller 101, such as part of instructions written in computer readable and executable code stored on a computer readable medium in or connected to the system controller 101. Additionally, in an embodiment, a utility meter 106 receives and transmits to the system controller 101 the demand limit and a notification of the demand state, such as that the demand state is a peak demand state.

The system controller 101 of embodiments receives information via an external communications network 107, which can include computer networks, the internet, energy line transmission/reception, electromagnetic radiation broadcast/reception, telephone networks, and other suitable forms as may be appropriate for a particular application. Embodiments send and receive signals between the system controller 101 and other components of the system 100 via an internal communications network 108 of the facility as represented schematically by the connecting lines between the system controller 101 and the various other components schematically illustrated in FIG. 4. In embodiments, the personal computer 105 and/or the internal communications network 108 is connected to the external communications network 107, such as via a combined router and modem 20, via separate router 21 and modem 22, via only a modem 22, or via another connection. The personal computer 105 in an embodiment is connected to the internal communications network 108. The internal communications network 108 in embodiments thus provides communication between the system controller 101, the energy consuming devices 102, the personal computer 105, the utility meter 106, and/or the external communications network 107.

The system controller 101 in an embodiment also communicates with a local or internal energy supply comprising, for example, a local energy storage device 116 and/or a local energy generation device 117 in an embodiment. In such an embodiment, a local energy storage device 116 and/or a local energy generation device 117 is connected to the external energy supply system, such as that of a utility, and to a facility internal energy distribution network, such as facility wiring, to selectively supply energy to the energy consuming devices 102 and/or to the external energy supply system responsive to the system controller 101. The system controller 101 commands the storage device 116 to charge when it is depleted, such as during an off-peak demand state. If the storage device 116 has enough energy to supply the energy consuming devices 102 during a peak demand state, or if demand in the facility simply exceeds the demand limit, then the system controller 101 supplements the facility's energy consumption with energy from the storage unit 116. Similarly, if facility energy demand exceeds the demand limit, whether or not there is a peak demand state, the system controller 101 can supplement the facility's energy consumption with energy from the local energy generation device 117. In embodiments, one device is both a local energy storage device and a local energy generation device.

In an embodiment, the system controller 101 receives managed device information, including information regarding the operational state, energy need, energy demand, and/or capabilities of the managed or energy consuming device 102 in the facility. Responsive to the information about the energy consuming device 102, the demand state, demand limit, facility energy consumption rate, and/or local energy supply availability, the system controller 101 controls operation of the energy consuming device 102 and energy consumption of the facility as a whole. In particular, the system controller 101 in an embodiment controls energy consumption of the facility based on the demand limit, taking any local or internal energy supply into account. The system controller 101 in an embodiment instructs the energy consuming device 102 to employ at least one operational mode, the system controller 101 choosing the at least one operational mode based on a rate charged for energy, a priority of the energy consuming device, and/or an energy need of the energy consuming device. As used herein, "energy need" means an amount of energy required for the energy consuming device 102 to operate above a predefined threshold. For example, a device's energy need might be defined as the amount of energy it needs to remain in a normal operational state.

In an embodiment in which no local energy supply is present, the system controller 101 compares the current rate of energy consumption to the demand limit. If the current rate of energy consumption is less than the demand limit, then additional energy can be drawn from the external energy supply and consumed by the facility. The system controller 101 then allocates the available energy to devices within the facility based on priority and need. In an embodiment, the system controller 101 receives a request from an energy consuming device 102 for energy, determines a priority and an energy need of the energy consuming device 102 requesting energy, and provides or denies energy to the requesting device based on the priority, energy need, available energy, and whether other energy consuming devices 102 in the facility can be operated at reduced energy consumption or shut off to provide additional energy for the requesting device if the available energy is not adequate.

In an embodiment in which local energy supply is present, the system controller 101 takes into account energy available from local energy storage and/or generation devices 116, 117, including the quantity of energy available and a rate at which the energy can be supplied (supply rate), and uses this local energy before drawing additional energy from the external energy supply. Thus, the facility energy consumption rate in excess of local energy supply is compared to the demand limit. If the local energy supply can provide all energy needed by the facility, then no energy need be drawn from the external energy supply. If the local energy supply exceeds the facility energy demand, then the system controller 101 can activate additional energy consuming devices, sell or send the excess energy to an external energy supplier. In an embodiment, the system controller 101 also enables as many energy consumption reduction measures as possible, within parameters provided by the customer, before drawing energy from the external energy supply.

The demand state and the demand limit in an embodiment are based on a preloaded schedule. The system controller 101 then controls the energy consuming device 102 in accordance with the schedule and the time of day. Additionally, the system controller 101 can take into account the date and/or the time of year. In an embodiment, the schedule is loaded or programmed by the customer or user, but in another embodiment, the system controller polls a demand server 103, such as a computer system based in a utility company facility 10, for the schedule. Alternatively, an embodiment determines the demand state and the demand limit by receiving updates from the demand server 103 when these variables change.

In embodiments in which a customer override can be employed, such as, for example, via the system user interface 104, the system controller 101 is responsive to the override command to permit operation of the energy consuming device 102 at a higher level of energy consumption than would otherwise be employed. In an embodiment in which subscription services or the like are employed, the system controller 101, in accordance with the terms of the subscription agreement to which the user or customer agreed, prevents execution of override instructions received from the user, though in an alternative embodiment, the system controller 101 executes but logs any override instructions and notifies the utility company of the override(s). In embodiments of the system in which the user or customer can designate which devices are managed by the system and which are not, and in which a subscription agreement requires certain devices to be managed by the system, the system controller 101 overrides customer designation of unmanaged devices when such devices are required to be managed by the subscription agreement. Alternatively, the controller 101 can log or notify the utility or third party that a required device has been removed from the management system.

Figure 5:
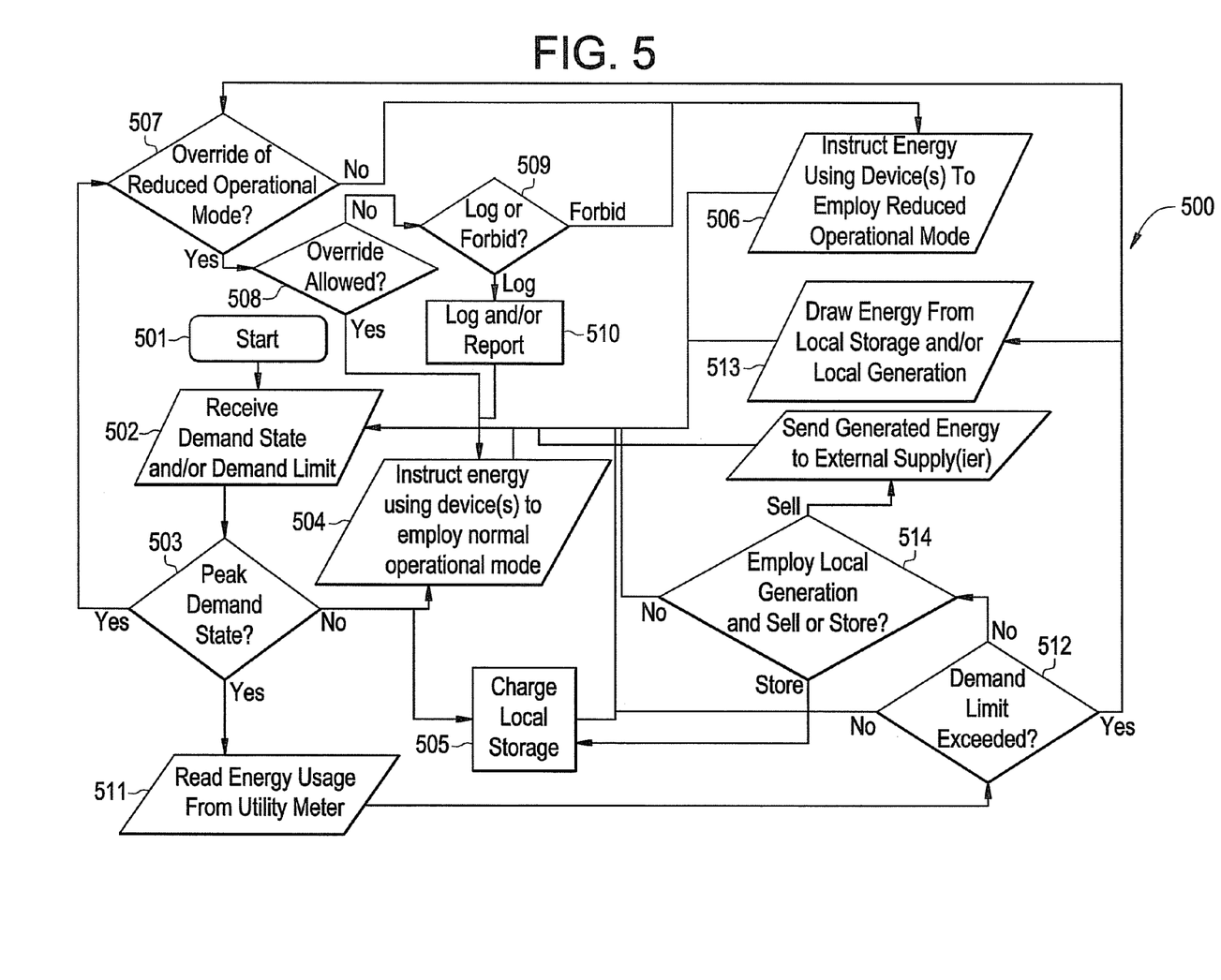
FIG. 5 is a schematic flow diagram illustrating a method according to an embodiment.
Figure 6:
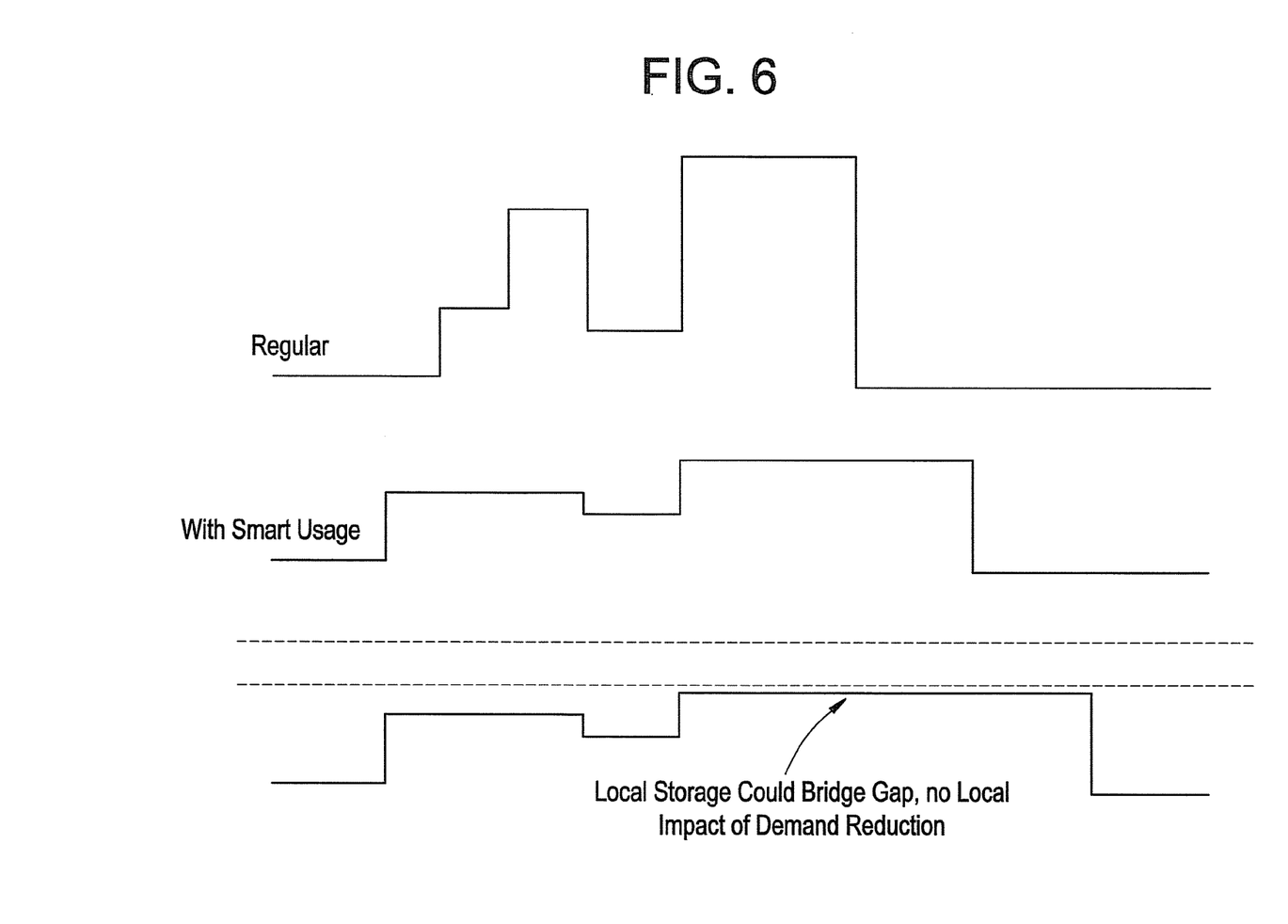
FIG. 6 is an illustration comparing facility energy demand in a facility without an embodiment to facility energy demand in the facility with an embodiment, as well as illustrating multiple demand levels and bridging a gap in demand by drawing on local energy storage or generation.

In an embodiment, a method is provided in computer executable code form on a computer readable medium that enables facility energy management when executed on a computer processor, such as a processor included in the system controller 101, as schematically illustrated in FIG. 5. The method in an embodiment is implemented as a computer software product comprising computer executable code stored on a recordable and/or computer readable medium. The system controller 101 in an embodiment loads and executes the computer executable code to carry out the method. Following start-up (block 501), in an embodiment, the method includes receiving the demand state and the demand limit (block 502). In a peak demand state, the energy production and supply network is operating at peak demand, while in an off-peak demand state, the energy production and supply network is operating below peak demand. Other demand states can be included to provide additional levels of energy savings and usage as appropriate. In embodiments, the system controller 101 receives a demand state and/or a demand limit from a table or the like based on time of day or on hours of light detected stored in a computer readable medium. In other embodiments, the system controller 101 receives the demand state and/or demand limit from a user via the user interface. In still other embodiments, the demand state and/or the demand limit comes from an external source, such as a demand server 103 hosted by a utility company or other party. Any combination of the manners of receiving the demand state and/or demand limit listed above can also be used.

Once the demand state and demand limit are received, the method includes checking to see if the demand state is a peak demand state (block 503). If not, then the method includes instructing the energy consuming device 102 to employ a normal operational mode (block 504) and returns to receiving the demand state and demand limit (block 502) in case one or both have changed. In addition, in an off-peak demand state, responsive to the presence of a local energy storage device and the energy storage device being depleted, the system controller 101 charges the energy storage device (block 505).

If the demand state is a peak demand state, then the system controller 101 can take several different courses of action. In an embodiment, the system controller 101 simply instructs the energy consuming device 102 to enter a reduced operational mode during a peak demand state (block 506). In another embodiment in which overrides are enabled, the method includes checking to see if an override command or instruction has been received (block 507). If an override command has been received, the method includes checking to see if overrides are allowed (block 508). If overrides are allowed, then the method proceeds by instructing the energy using device(s) to employ normal operational mode (block 504). If overrides are not allowed, then the method includes checking to see whether overrides are logged and/or reported or are forbidden (block 509). If overrides are forbidden, the method proceeds by instructing the energy using device(s) to employ the reduced operational mode (block 506). If overrides are logged and/or reported, then the method includes logging and/or reporting the override (block 510) and instructing the energy using device(s) to employ normal operational mode (block 504).

In another embodiment, the method responds to a peak demand state after block 503 by checking facility energy consumption (block 511), such as by reading a utility meter of the facility, and compares the rate of energy consumption rate to the demand limit (block 512). If the demand limit is exceeded, the system controller 101 instructs the energy consuming device to employ a reduced operational mode (block 506) and/or draws energy from a local energy storage 116 and/or a local energy generating device 117, responsive to the presence of such energy storage and/or generation device(s) (block 513). Additionally, in an embodiment, if there is excess local generation capacity available when the demand limit is not exceeded, then the controller will determine whether to bring energy generation devices online for selling or storing the energy (block 514). If so, and the energy is to be stored, then the method charges local storage (block 505) and returns to receiving the demand state and/or demand limit (block 502). If the energy generation devices are brought online and the energy is to be sold, then the method sends the energy to an external energy supply(ier) (block 515) and returns to receiving the demand state and/or demand limit (block 502). The system controller 101 throughout the method can take into account the nature of any present energy generation device, such as by more readily engaging renewable energy generation by solar or wind powered energy generation devices, and take into account the presence of any energy storage device.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

A method according to embodiments is realized via, and a system according to embodiments includes, computer-implemented processes and apparatus for practicing such processes, such as the system controller 101. Additionally, an embodiment includes a computer program product including computer code, such as object code, source code, or executable code, on tangible media, such as magnetic media (floppy diskettes, hard disc drives, tape, etc.), optical media (compact discs, digital versatile/video discs, magneto-optical discs, etc.), random access memory (RAM), read only memory (ROM), flash ROM, erasable programmable read only memory (EPROM), or any other computer readable storage medium on which the computer program code is stored and with which the computer program code can be loaded into and executed by a computer. When the computer executes the computer program code, it becomes an apparatus for practicing the invention, and on a general purpose microprocessor, specific logic circuits are created by configuration of the microprocessor with computer code segments. A technical effect of the executable instructions is to implement energy consumption reduction and/or optimization in an energy consuming device, a facility with at least one energy consuming device, and/or an energy supply distribution system.

The computer program code is written in computer instructions executable by the controller, such as in the form of software encoded in any programming language. Examples of suitable programming languages include, but are not limited to, assembly language, VHDL (Verilog Hardware Description Language), Very High Speed IC Hardware Description Language (VHSIC HDL), FORTRAN (Formula Translation), C, C++, C#, Java, ALGOL (Algorithmic Language), BASIC (Beginner All-Purpose Symbolic Instruction Code), APL (A Programming Language), ActiveX, HTML (HyperText Markup Language), XML (eXtensible Markup Language), and any combination or derivative of one or more of these.

By employing the energy management system of embodiments, even at a facility level, demand can be spread to reduce strain on the energy supply. By employing the energy management system of embodiments to manage multiple facilities, multiple utility companies, and/or multiple groups of utility companies making up an energy supply, demand on the entire energy supply grid can be spread, reducing strain on the overall energy supply. An additional benefit in each case is cost savings to customers at every level, and profit maximization to the entities selling energy.

The corresponding structures, materials, acts, and equivalents of any and all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An energy management system for at least one managed device disposed to receive energy via a meter connected to an energy supply including at least one of an secondary external energy source and an internal energy source, the internal energy source configured to provide primary power for the at least one managed device, the system comprising:
   a system controller comprising a computer processor configured for communication with the at least one managed device, the meter, and a computer readable storage medium containing computer executable instructions that when executed by the computer processor performs a method comprising:
      obtaining an energy consumption rate of the at least one managed device from the meter;
      determining whether the energy consumption rate exceeds energy available from the internal energy source configured to provide primary power for the at least one managed device;
      obtaining demand information from a demand information source, the demand information comprising information about a demand state of the external energy source;
      determining from the demand information whether the demand state of the external energy source is a peak demand state;
      determining a priority of the at least one managed device;
      determining an energy need of the at least one managed device; and
      instructing the at least one managed device to employ an operational mode based on the priority, the energy need, the demand state and whether the energy consumption rate of the at least one managed device exceeds energy available from at least one of the external energy source and internal energy source.

2. The system of claim 1 wherein the demand information source is a remote demand server and obtaining demand information comprises receiving a demand state from the remote demand server.

3. The system of claim 1 wherein the demand information source is a user interface and obtaining demand information comprises receiving a demand state from the user interface.

4. The system of claim 1 wherein the demand information source is a computer readable storage medium and obtaining demand information comprises receiving the demand state from the computer readable storage medium.

5. The system of claim 1 wherein the system controller further performs determining the value of a demand limit, and determining an operational mode comprises maintaining a consumption rate of energy from the external energy source below the demand limit.

6. The system of claim 5 wherein the demand information source includes a demand limit allocated to a facility in which the at least one managed device resides based on time of day, actual energy consumption of the external energy source, and expected energy consumption of the external energy source.

7. The system of claim 6 wherein the system controller further performs sending local energy consumption information to the demand information source.

8. The system of claim 5 wherein determining the value of a demand limit comprises receiving the demand limit from a remote computer-based demand server.

9. The system of claim 1 wherein the system controller further performs receiving managed device information including at least one of a maximum energy consumption rate, available operational modes, and a minimum energy consumption rate, and determining an operational mode is further based on the managed device information.

10. The system of claim 9 wherein the managed device information is supplied by at least one managed device.

11. The system of claim 9 wherein the managed device information is supplied by a user.

12. A facility energy management system for at least one managed device, the system configured for managing energy consumption of a facility connected to an energy supply, the energy supply including at least one of an external energy source and an internal energy source, the internal energy source configured to provide primary power for the at least one managed device, the facility having at least one energy consuming device, and the system comprising:
   a system controller comprising a computer processor configured for communication with the at least one managed device, the external energy source, and the internal energy source and with a computer readable storage medium containing computer executable instructions that when executed by the computer processor performs a method comprising:
      obtaining external energy source information including demand state, demand limit, and cost;
      obtaining internal energy source information including at least one of a quantity of energy available and a supply rate available, the internal energy source configured to provide primary power for the at least one managed device;
      establishing a maximum energy consumption value for the facility based on the external and internal energy source information;
      instructing the at least one managed device to employ an operational mode based on the maximum energy consumption value, the demand state, and the demand limit.

13. The system of claim 12 wherein the method further comprises obtaining a priority and an energy need of the managed device and instructing the energy consuming device to enter an operational mode is also based on at least one of the priority and the energy need of the managed device.

14. The system of claim 12 wherein the managed device comprises an energy consuming device.

15. The system of claim 12 wherein the facility comprises a utility and the managed device comprises a facility including at least one energy consuming device.

16. The system of claim 12 wherein the method further comprises controlling distribution of energy from the internal energy source between charging local energy storage and redistributing energy to the at least one energy consuming device during peak demand period.

17. The system of claim 12 wherein the method further comprises controlling distribution of energy consumption between use of energy from the external energy source and use of energy from discharging energy storage.

18. The system of claim 12 wherein obtaining external energy source information comprises communicating with a computer-based demand server configured to provide the external energy source information.

19. The system of claim 12 wherein the at least one managed device is disposed to receive the energy from the external energy source via a meter connected to an external energy supply, and the method further comprises obtaining an energy consumption rate of the managed device from the meter, and instructing the at least one managed device to employ an operational mode is further based on the energy consumption rate obtained from the meter.

20. The system of claim 12 wherein the method further comprises determining a priority of each of the at least one managed devices, determining an energy need of the at least one managed device, and instructing the at least one managed device to employ an operational mode is further based on the priority and energy need of the at least one managed device.

21. A facility energy management system for a facility connected to and selectively drawing energy from an external energy supply, the system comprising:
 a computer readable storage medium including computer executable code in a format readable and executable by a computer processor;
 a system controller including a computer processor and connected to the computer readable storage medium, the system controller configured to load and execute the computer executable code to:
 receive a facility demand limit;
 determine a demand state that is one of at least a peak demand state and an off-peak demand state;
 allocate a facility energy demand of a facility based on a priority of an energy consuming device in the facility and on an energy need of the energy consuming device, the energy need being determined by a minimum energy requirement of the energy consuming device for proper operation;
 responsive to determining that a local energy storage unit is present and is depleted, initiate charging the local energy storage unit during an off-peak demand state;
 responsive to determining that a local energy storage unit is present and that an energy demand of the facility exceeds the demand limit, draw energy from the local energy storage unit;
 responsive to determining that a local energy generation device is present, initiate drawing energy from the local energy generation device when an energy demand of the facility exceeds the demand limit;
 responsive to a high priority of the energy consuming device, instruct the energy consuming device to employ a normal operational mode;
 responsive to a low priority of the energy consuming device, instruct the energy consuming device to employ a reduced operational mode;
 responsive to an energy need of the energy consuming device exceeding an amount of energy supplied in a reduced operational mode, override an instruction to employ the reduced operational mode; and
 responsive to a customer command, override an instruction to employ the reduced operational mode.

22. The system of claim 21 wherein the demand state is determined and the demand limit is received by communicating with an external computer-based demand server.

* * * * *

UNITED STATES PATENT AND TRADEMARK OFFICE
CERTIFICATE OF CORRECTION

PATENT NO. : 8,548,638 B2  
APPLICATION NO. : 12/388195  
DATED : October 1, 2013  
INVENTOR(S) : Roscoe et al.

It is certified that error appears in the above-identified patent and that said Letters Patent is hereby corrected as shown below:

On the title page, item (57), under "ABSTRACT", in Column 2, Line 3,
delete "an energy supply, the energy supply." and insert -- the energy supply. --, therefor.

In the Specification

In Column 1, Line 13, delete "a energy" and insert -- an energy --, therefor.

In Column 2, Line 38, delete "unit. amd." and insert -- unit, and, --, therefor.

In Column 2, Line 47, delete "and." and insert -- and --, therefor.

In Column 3, Line 40, delete "ore" and insert -- or --, therefor.

Signed and Sealed this  
Thirty-first Day of December, 2013

Margaret A. Focarino  
*Commissioner for Patents of the United States Patent and Trademark Office*